United States Patent
Yeon et al.

(10) Patent No.: US 9,738,523 B2
(45) Date of Patent: Aug. 22, 2017

(54) CARBIDE-DERIVED CARBON MANUFACTURED BY USING HEAT TREATMENT AT VACUUM AND METHOD THEREOF

(71) Applicant: Korea Institute of Energy Research, Daejeon (KR)

(72) Inventors: Sun-Hwa Yeon, Daejeon (KR); Kyoung-Hee Shin, Daejeon (KR); Chang-Soo Jin, Daejeon (KR); Kyu-Nam Jung, Daejeon (KR); Sukeun Yoon, Daejeon (KR); Jae-Deok Jeon, Daejeon (KR); Joonmok Shim, Daejeon (KR); Jung-Hoon Yang, Daejeon (KR); Bum-Suk Lee, Daejeon (KR); Myung Seok Jeon, Daejeon (KR); Wook Ahn, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 273 days.

(21) Appl. No.: 14/539,286

(22) Filed: Nov. 12, 2014

(65) Prior Publication Data
US 2016/0130146 A1    May 12, 2016

(51) Int. Cl.
*C01B 31/02* (2006.01)
*H01M 4/587* (2010.01)
*H01G 11/32* (2013.01)
*C01B 31/00* (2006.01)
*C01B 21/082* (2006.01)
*H01G 11/86* (2013.01)

(52) U.S. Cl.
CPC .......... *C01B 31/02* (2013.01); *C01B 21/0828* (2013.01); *C01B 31/00* (2013.01); *H01G 11/32* (2013.01); *H01G 11/86* (2013.01); *H01M 4/587* (2013.01); *C01P 2002/74* (2013.01); *C01P 2006/12* (2013.01); *C01P 2006/40* (2013.01); *Y02E 60/13* (2013.01)

(58) Field of Classification Search
CPC ....................................................... C01B 31/02
See application file for complete search history.

(56) References Cited

U.S. PATENT DOCUMENTS 3,066,099 A * 11/1962 Mohun ............... B01J 27/22
423/449.1

FOREIGN PATENT DOCUMENTS

KR    1020080054165 A    6/2008

OTHER PUBLICATIONS

Oschatz et al.: "A cubic ordered, mesoporous carbide-derived carbon for gas and energy storage applications", Department of Inorganic Chemistry, Dresden University of Technology, Mommsenstraβe 6, D-01069 Dresden, Germany, Carbon 48 (2010), pp. 3987-3992.

* cited by examiner

*Primary Examiner* — Stuart Hendrickson
(74) *Attorney, Agent, or Firm* — Westman, Champlin & Koehler, P.A.; Amanda M. Prose

(57) ABSTRACT

Disclosed is a method of preparing a carbide-derived carbon having high ion mobility for use in a lithium battery anode material, a lithium air battery electrode, a supercapacitor electrode, and a flow capacitor electrode, including thermally treating a carbide compound in a vacuum, thus obtaining a vacuum-treated carbide compound; and thermochemically reacting the vacuum-treated carbide compound with a halogen element-containing gas, thus extracting the element other than carbon from the vacuum-treated carbide compound, wherein annealing can be further performed after thermochemical reaction. This carbide-derived carbon has a small pore distribution, dense graphite fringe, and a large lattice spacing and thus high ion mobility, compared to conventional carbide-derived carbon obtained only by thermochemical reaction with a halogen element-containing gas.

10 Claims, 5 Drawing Sheets

CARBIDE-DERIVED CARBON MANUFACTURED BY USING HEAT TREATMENT AT VACUUM AND METHOD THEREOF

BACKGROUND OF THE INVENTION

1. Field of the Invention

The present invention relates to a carbide-derived carbon prepared by thermal treatment in a vacuum and a method of preparing the same. More particularly, the present invention relates to a carbide-derived carbon and a method of preparing the same, wherein a carbide compound is thermally treated in a vacuum so that carbide particles are pretreated into a high-density agglomerate to obtain a vacuum-treated carbide compound that is then thermochemically reacted with a halogen element-containing gas so as to extract the element other than carbon, giving a carbide-derived carbon.

2. Description of the Related Art

Lithium ion secondary batteries for use in mobile phones, personal digital assistants (PDAs), digital cameras, camcorders, etc. are configured in the form of a chemical battery system using an oxide cathode material and a graphite anode material. Such electrode materials are prepared into a slurry together with an appropriate binder and conductor to fabricate a cathode plate and an anode plate, which are then wound or stacked with a separator to form a core cell, followed by encasing the core cell, thereby manufacturing a lithium ion secondary battery having a cylindrical, rectangular, or pouch shape.

Thorough research is ongoing into enhancing performance of lithium ion secondary batteries, including capacity and energy density. To this end, methods of enhancing performance through design improvements and also through material developments and improvements have been devised. However, optimal performance enhancement is considered to be due to development of electrode active materials.

When lithium metal is used for an anode to correspond to a lithium transition metal oxide as the cathode material, high energy density and low self-discharge rate may be exhibited, but serious problems are generated during the actual charge/discharge of batteries. First, lithium metal is dissociated into lithium ions in an electrolyte during discharge and then deposited as lithium metal at an anode during charge. As such, there are many cases where the deposited metal is not restored into lithium in a uniform planar phase before discharge but may be formed into needle-shaped crystals, twig-shaped crystals, or particle crystals. As the charge process progresses, such crystals are continuously grown and ultimately reach the cathode through the separator, undesirably causing an internal short circuit or deteriorating cycle properties. Furthermore, a large charge current facilitates crystallization, and thus cycle properties may remarkably deteriorate during quick charge.

Second, lithium metal may sufficiently exhibit high energy density properties of lithium at low load, whereas the anode utilization may decrease during high-load discharge, undesirably lowering the energy density. On the other hand, cycle properties may be comparatively good during high-load discharge but may remarkably decrease during low-load discharge. The use of lithium metal for the anode makes it very difficult to balance load properties and cycle properties.

Hence, lithium ion secondary batteries have been developed to employ, as an anode material, a carbon material having electrode potential similar to that of lithium metal while enabling electrochemical interlayer intercalation/deintercalation of lithium ions, instead of using lithium metal as the anode due to the aforementioned problems. As for the anode, the use of carbon material able to form an interlayer compound may result in only movement of lithium during charge/discharge, and the original shape of the anode material is maintained, thereby increasing the lifetime of the battery. Although a graphite material having advantages as above has been receiving attention as the anode active material, it has theoretical capacity limitation of 372 mAh/g, and thus anode materials that may replace currently used anode materials are under study.

Accordingly, a material for an electron emission source to emit electrons may include a carbon material, for example, carbon nanotubes having superior conductivity, field concentration effects and field emission properties, and low work function. However, carbon nanotubes are typically provided in the form of fiber having high field enhancement factor, and a material having such a shape has many defects in terms of material uniformity and lifetime. Also, when made into paste, ink or slurry, carbon nanotubes in fiber form may incur poor process problems compared to other materials in particle form. Moreover, carbon nanotubes are undesirable because materials therefor are very expensive.

With the goal of solving the problems with carbon nanotubes, thorough research into carbide-derived carbon is being carried out. However, a carbide-derived carbon resulting from simply thermochemically reacting a carbide compound with a halogen element-containing gas does not have a uniform shape because crystalline graphite and amorphous carbon coexist. Furthermore, limitations are imposed on manifesting stable performance as the secondary battery anode material due to formation of pores between amorphous carbon particles and formation of mesopores due to high temperature.

SUMMARY OF THE INVENTION

Accordingly, the present invention has been made keeping in mind the above problems encountered in the related art, and an object of the present invention is to provide a carbide-derived carbon (CDC) and a method of preparing the same, wherein the carbide-derived carbon may be prepared by thermally treating a carbide compound in a vacuum, thermochemically reacting the vacuum-treated carbide compound with a halogen element-containing gas, and performing annealing, thus extracting the element other than carbon from the vacuum-treated carbide compound, and may exhibit dense graphite crystallinity and a large lattice spacing and thus high ion mobility, and thereby may be suitable for use in lithium battery anode materials, lithium air battery electrodes, supercapacitor electrodes, or flow capacitor electrodes.

Another object of the present invention is to provide a lithium battery anode material, a lithium air battery electrode material, a supercapacitor electrode, or a flow capacitor electrode, including the carbide-derived carbon as above.

In order to accomplish the above objects, the present invention provides a method of preparing a carbide-derived carbon, comprising: thermally treating a carbide compound in a vacuum, thus obtaining a vacuum-treated carbide compound; and thermochemically reacting the vacuum-treated carbide compound with a halogen element-containing gas, thus extracting the element other than carbon from the vacuum-treated carbide compound.

The carbide compound may be a compound of carbon and an element selected from the group consisting of Groups 3, 4, 5, and 6 elements, and combinations thereof, and is preferably at least one selected from the group consisting of SiC, $B_xC_y$, TiC, $ZrC_x$, $Al_xC_y$, $Ca_xC_y$, $Ti_xTa_yC$, $Mo_xW_yC$, $TiN_xC_y$, $ZrN_xC_y$, $SiC_4$, TiAlC, and $Mo_2C$, wherein x and y are stoichiometrically determined.

Thermally treating in a vacuum may be performed at 1100~1900° C. for 3~7 hr.

The halogen element-containing gas may be selected from the group consisting of $Cl_2$, $TiCl_4$, and $F_2$.

Thermochemically reacting may be performed at 200~1200° C. for 3~5 hr.

The method may further comprise performing annealing with any one gas selected from the group consisting of $H_2$, Ar, $N_2$, and $NH_3$, after thermochemically reacting. As such, annealing may be conducted for 1~3 hr.

In addition, the present invention provides a carbide-derived carbon, which is prepared by thermally treating a carbide compound in a vacuum to obtain a vacuum-treated carbide compound, and thermochemically reacting the vacuum-treated carbide compound with a halogen element-containing gas, thus extracting the element other than carbon from the vacuum-treated carbide compound.

The carbide-derived carbon may have a Brunauer-Emmett-Teller (BET) area of 1200~1700 m²/g, and an X-ray diffraction (XRD) intensity of a peak located between 20° and 30° based on XRD analytical results may be 6000~8000.

In addition, the present invention provides a carbide-derived carbon, which is prepared by thermally treating a carbide compound in a vacuum to obtain a vacuum-treated carbide compound, thermochemically reacting the vacuum-treated carbide compound with a halogen element-containing gas, and performing annealing with $H_2$ gas, thus extracting the element other than carbon from the vacuum-treated carbide compound.

The carbide-derived carbon may have a BET area of 1200~1700 m²/g, and an XRD intensity of a peak located between 20° and 30° based on XRD analytical results may be 6000~8000.

According to the present invention, a carbide compound is thermally treated in a vacuum so that carbide particles are made into a high-density agglomerate, thus obtaining a vacuum-treated carbide compound that is then thermochemically reacted with a halogen element-containing gas, whereby the element other than carbon may be extracted from the vacuum-treated carbide compound, giving a carbide-derived carbon (CDC), which has a small distribution of mesopores and pores between amorphous carbon particles, dense graphite crystallinity, and a large lattice spacing and thus high ion mobility. Furthermore, a carbide-derived carbon is configured such that amorphous carbon is reduced and graphite crystallinity is uniformly distributed, and thereby intercalation and deintercalation of ions into and from crystal lattices are regular, resulting in stable charge/discharge efficiency.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Figure 1:
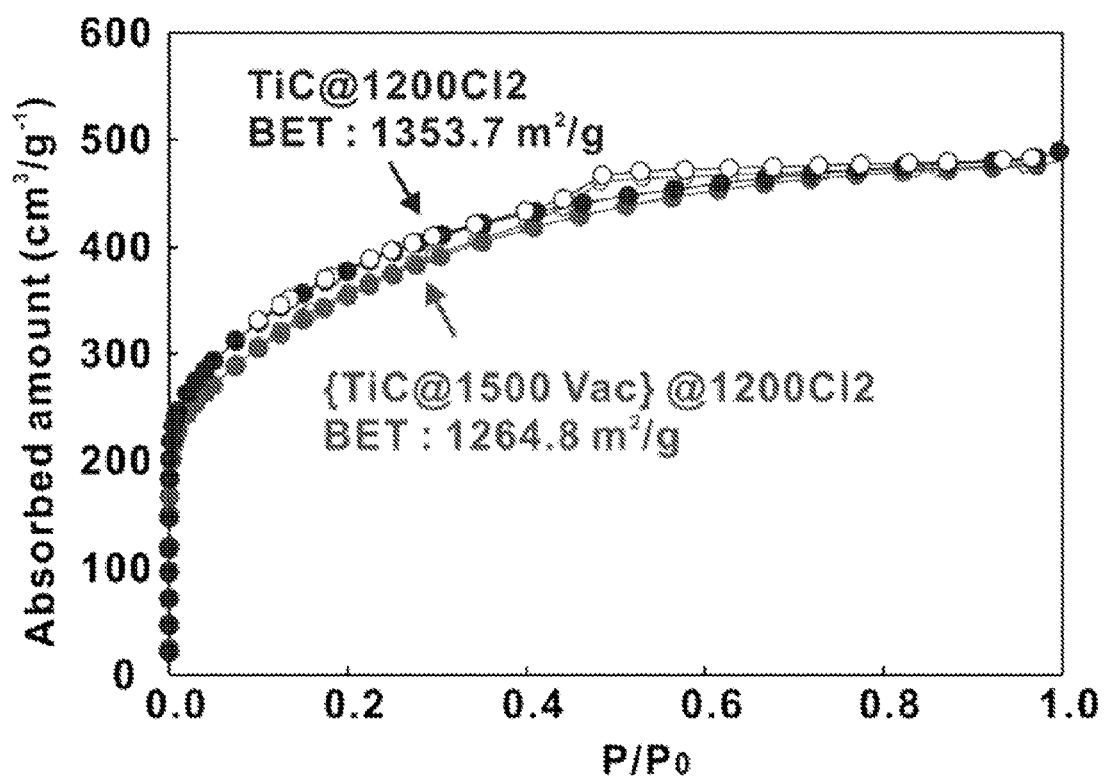
FIG. 1 illustrates a graph of the $N_2$ adsorption curve of vacuum-treated TiC-CDC obtained by thermal treatment at 1500° C. in a vacuum and thermochemical reaction with $Cl_2$ gas at 1200° C. and TiC-CDC obtained by thermochemical reaction with $Cl_2$ gas at 1200° C.

The present invention addresses a method of preparing a carbide-derived carbon (CDC), comprising: thermally treating a carbide compound in a vacuum, thus obtaining a vacuum-treated carbide compound; and thermochemically reacting the vacuum-treated carbide compound with a halogen element-containing gas, thus extracting the element other than carbon from the vacuum-treated carbide compound.

The carbide compound may be a compound of carbon and any element selected from the group consisting of Groups 3, 4, 5, and 6 elements, and combinations thereof. Particularly useful is any one selected from the group consisting of SiC, $B_xC_y$, TiC, $ZrC_x$, $Al_xC_y$, $Ca_xC_y$, $Ti_xTa_yC$, $Mo_xW_yC$, $TiN_xC_y$, $ZrN_xC_y$, $SiC_4$, TiAlC, and $Mo_2C$, but the carbide compound is not limited thereto so long as it is a compound of carbon and any element selected from the group consisting of Groups 3, 4, 5, and 6 elements, and combinations thereof. As such, x and y may be stoichiometrically determined.

Thermally treating the carbide compound in a vacuum is performed at 1100~1900° C., preferably 1400~1600° C., and more preferably 1500° C. Also, such thermal treatment in a vacuum is carried out for 3~7 hr, and preferably for 4 hr. When the carbide compound is thermally treated in a vacuum in this way, micrometer-sized carbide particles of the carbide compound may be agglomerated into a high-density agglomerate.

The halogen element-containing gas may be $Cl_2$, $TiCl_4$ or $F_2$, but is not limited thereto so long as it is halogen element-containing gas.

The thermochemical reaction between the vacuum-treated carbide compound and the halogen element-containing gas is carried out at 200~1200° C., preferably 800~1200° C. and more preferably 1200° C. The thermochemical reaction time with the halogen element-containing gas may be set to 3~5 hr.

When the vacuum-treated carbide compound is thermochemically reacted with the halogen element-containing gas, the element other than carbon is removed from the vacuum-treated carbide compound, thus forming nanopores, yielding a carbide-derived carbon having nano-sized pores and also dense graphite crystallinity.

The method of preparing the carbide-derived carbon according to the present invention may further include annealing the vacuum-treated carbide compound with any one gas selected from the group consisting of $H_2$, Ar, $N_2$, and $NH_3$, after thermochemically reacting the vacuum-treated carbide compound with the halogen element-containing gas. When annealing is performed in this way, any halogen gas or metal product remaining on the surface of carbon after thermochemical reaction may be removed, thus obtaining a carbide-derived carbon having high purity. Also, $H_2$ gas used for annealing is merely illustrative and any known gas able to react with the halogen gas or metal product may be adopted therefor.

In addition, the present invention addresses a carbide-derived carbon prepared by thermally treating a carbide compound in a vacuum to obtain a vacuum-treated carbide compound, which is then thermochemically reacted with a halogen element-containing gas, thus extracting the element other than carbon from the vacuum-treated carbide compound. Also, the present invention addresses a carbide-derived carbon prepared by thermally treating a carbide compound in a vacuum to obtain a vacuum-treated carbide compound, which is then thermochemically reacted with a halogen element-containing gas and then annealed with $H_2$ gas, thus extracting the element other than carbon from the vacuum-treated carbide compound.

The carbide-derived carbon subjected to annealing may exhibit high purity by removing the halogen gas or metal product from the surface of carbon after thermochemical reaction, compared to carbide-derived carbon not subjected to annealing. However, this does not mean that the purity of the carbide-derived carbon not subjected to annealing is low.

The carbide-derived carbon may have a BET area of 1200~1700 $m^2/g$, and an XRD intensity of 6000~8000 of a peak located between 20° and 30° based on the XRD analytical results.

The carbide-derived carbon has nano-sized pores, dense graphite crystallinity, and a large lattice spacing of a basal plane to thus enable efficient ion movement, and thereby may be utilized as an energy storage medium in various fields. Examples of the energy storage medium may include, but are not limited to, anodes for primary batteries, secondary batteries and lithium batteries, lithium air battery electrode materials, supercapacitor electrodes, flow capacitor electrodes, fuel cell catalyst supports, and hydrogen storage mediums.

With reference to the appended drawings, a better understanding of the present invention may be obtained via the following examples, which are set forth to illustrate, but are not to be construed as limiting the present invention. Examples of the present invention are provided for a full explanation to those skilled in the art.

Example 1: Preparation of Vacuum-Treated TiC-CDC Via Thermal Treatment at 1500° C. in Vacuum and Thermochemical Reaction with $Cl_2$ at 1200° C.

Useful as a carbide compound, TiC was thermally treated at 1500° C. for 4 hr in a vacuum, thus obtaining vacuum-treated TiC, which was then thermochemically reacted with $Cl_2$ as a halogen element-containing gas at 1200° C. for about 3 hr and then annealed with $H_2$ gas for about 2 hr, yielding vacuum-treated TiC-CDC.

The process for reacting the carbide compound with the halogen element-containing gas to prepare CDC is represented by Scheme 1 below.

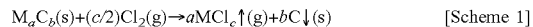

$$M_aC_b(s)+(c/2)Cl_2(g) \rightarrow aMCl_c\uparrow(g)+bC\downarrow(s) \quad \text{[Scheme 1]}$$

In Scheme 1, M indicates a metal, C indicates carbon, and a, b and c indicate stoichiometric ratios.

Comparative Example 1: Preparation of TiC-CDC Via Thermochemical Reaction with $Cl_2$ Gas at 1200° C.

TiC-CDC was prepared by thermochemically reacting TiC as a carbide compound with $Cl_2$ as a halogen element-containing gas at 1200° C. for about 3 hr.

Test Example 1: Measurement of $N_2$ Adsorbed Amount and BET of Vacuum-Treated TiC-CDC and TiC-CDC The $N_2$ adsorption curves of Example 1 and Comparative Example 1 were graphed. As illustrated in FIG. 1, the $N_2$ adsorption curve of Example 1 showed a type-4 curve with adsorption/desorption hysteresis, corresponding to a mesoporous structure, and specific surface areas (BET areas) were 1264.8 $m^2/g$ and 1353.7 $m^2/g$.

Both Example 1 and Comparative Example 1 show type-4 curves corresponding to a mesoporous structure. The $N_2$ adsorption curve of Example 1 was distributed at the low adsorbed amount compared to the $N_2$ adsorption curve of Comparative Example 1 and thus had a small amount of mesopores. Such a reduction in the mesopores resulted in a decreased BET area, and Example 1 had a dense graphite structure and uniform crystallinity, compared to Comparative Example 1.

Figure 2:
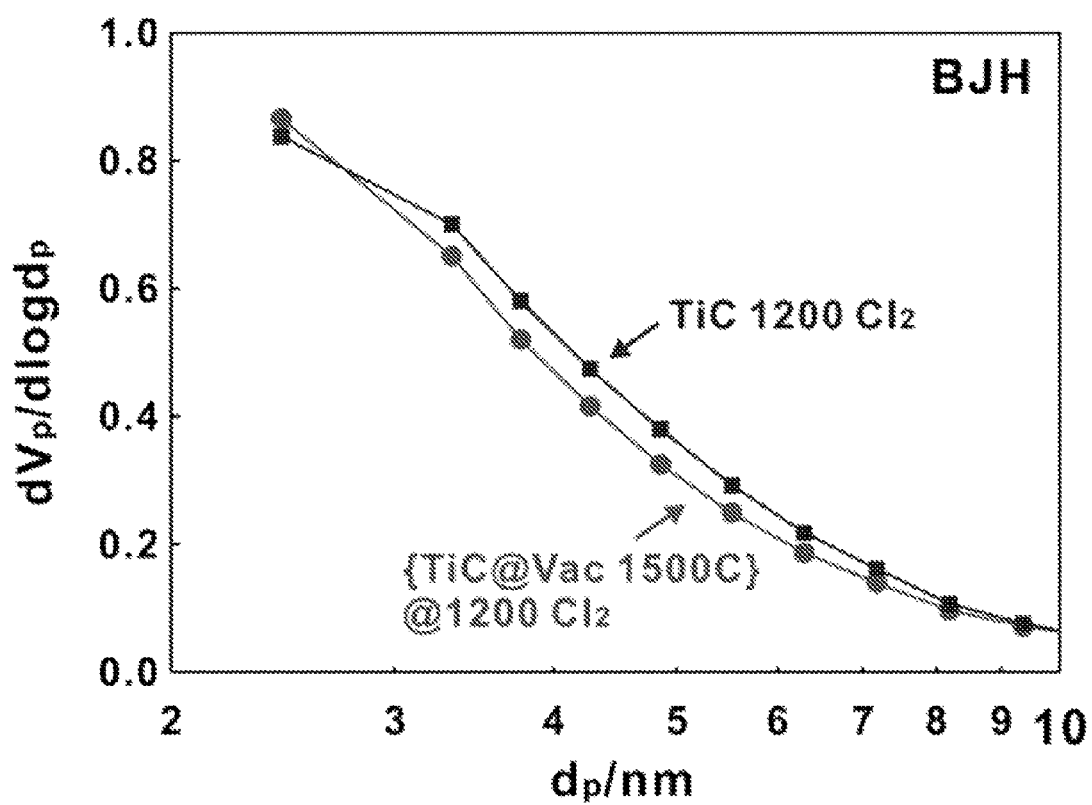
FIG. 2 illustrates a graph of the pore size distribution measured by a Barrett-Joyner-Halenda (BJH) method in $N_2$ adsorption curves of vacuum-treated TiC-CDC obtained by thermal treatment at 1500° C. in a vacuum and thermochemical reaction with $Cl_2$ gas at 1200° C. and TiC-CDC obtained by thermochemical reaction with $Cl_2$ gas at 1200° C.

Test Example 2: Measurement of Pore Size Distribution of Vacuum-Treated TiC-CDC and TiC-CDC Via BJH and MP Analysis The adsorption results of Example 1 and Comparative Example 1 were analyzed using a BJH method. The pore size distributions thereof are illustrated in FIG. 2. Also, the pore size distributions thereof obtained via adsorption analysis using an MP method are illustrated in FIG. 3.

Figure 3:
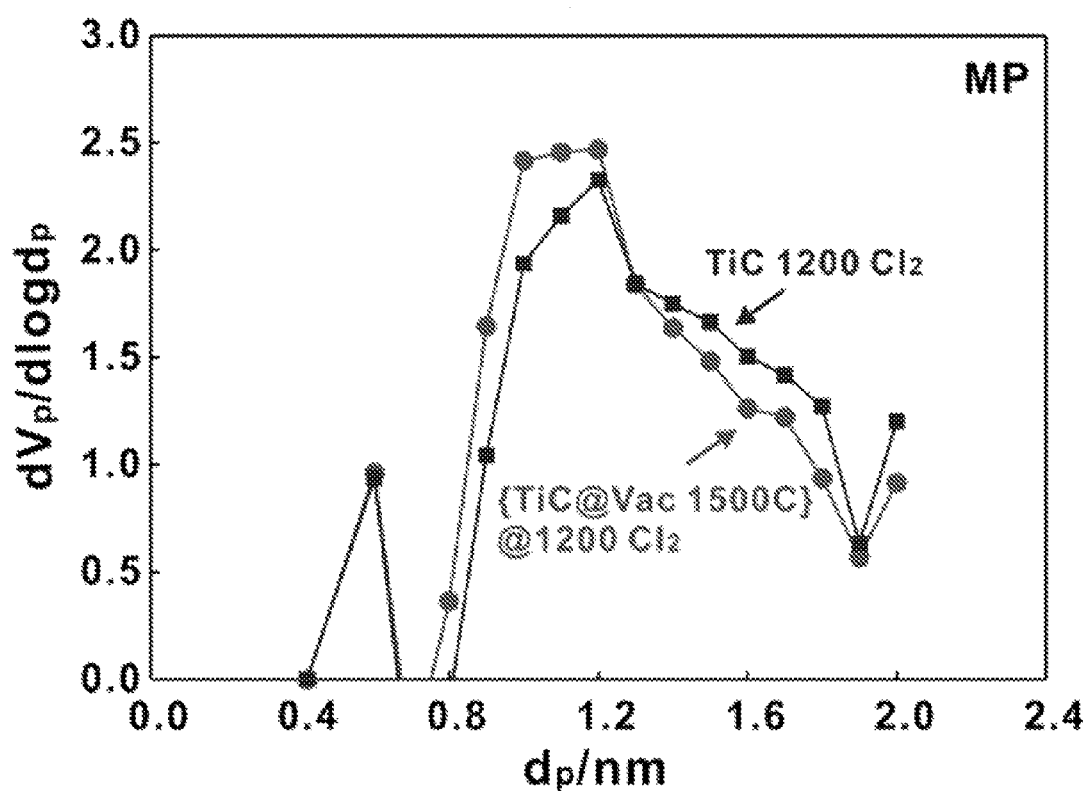
FIG. 3 illustrates a graph of the pore size distribution measured by a micropore (MP) method in vacuum-treated TiC-CDC obtained by thermal treatment at 1500° C. in a vacuum and thermochemical reaction with $Cl_2$ gas at 1200° C. and TiC-CDC obtained by thermochemical reaction with $Cl_2$ gas at 1200° C.

As illustrated in FIGS. 2 and 3, Example 1 had nano-sized pores and exhibited a small pore distribution, compared to Comparative Example 1. This is because thermal treatment in a vacuum enables the carbide compound to be formed into a dense structure and then thermochemical reaction with the halogen element-containing gas enables the pore distribution to be reduced and the graphite crystallinity to become dense.

Test Example 3: XRD Measurement of Vacuum-Treated TiC-CDC and TiC-CDC

Figure 4:
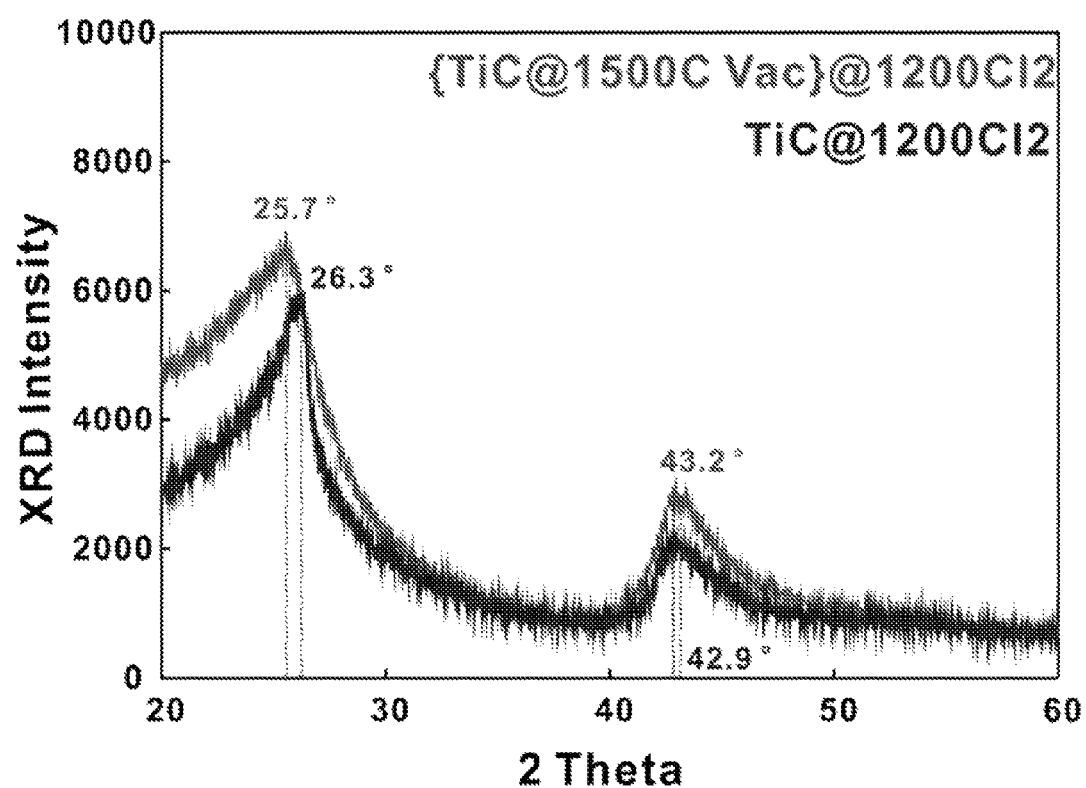
FIG. 4 illustrates a graph of the XRD pattern of vacuum-treated TiC-CDC obtained by thermal treatment at 1500° C. in a vacuum and thermochemical reaction with $Cl_2$ gas at 1200° C. and TiC-CDC obtained by thermochemical reaction with $Cl_2$ gas at 1200° C.
Figure 5:
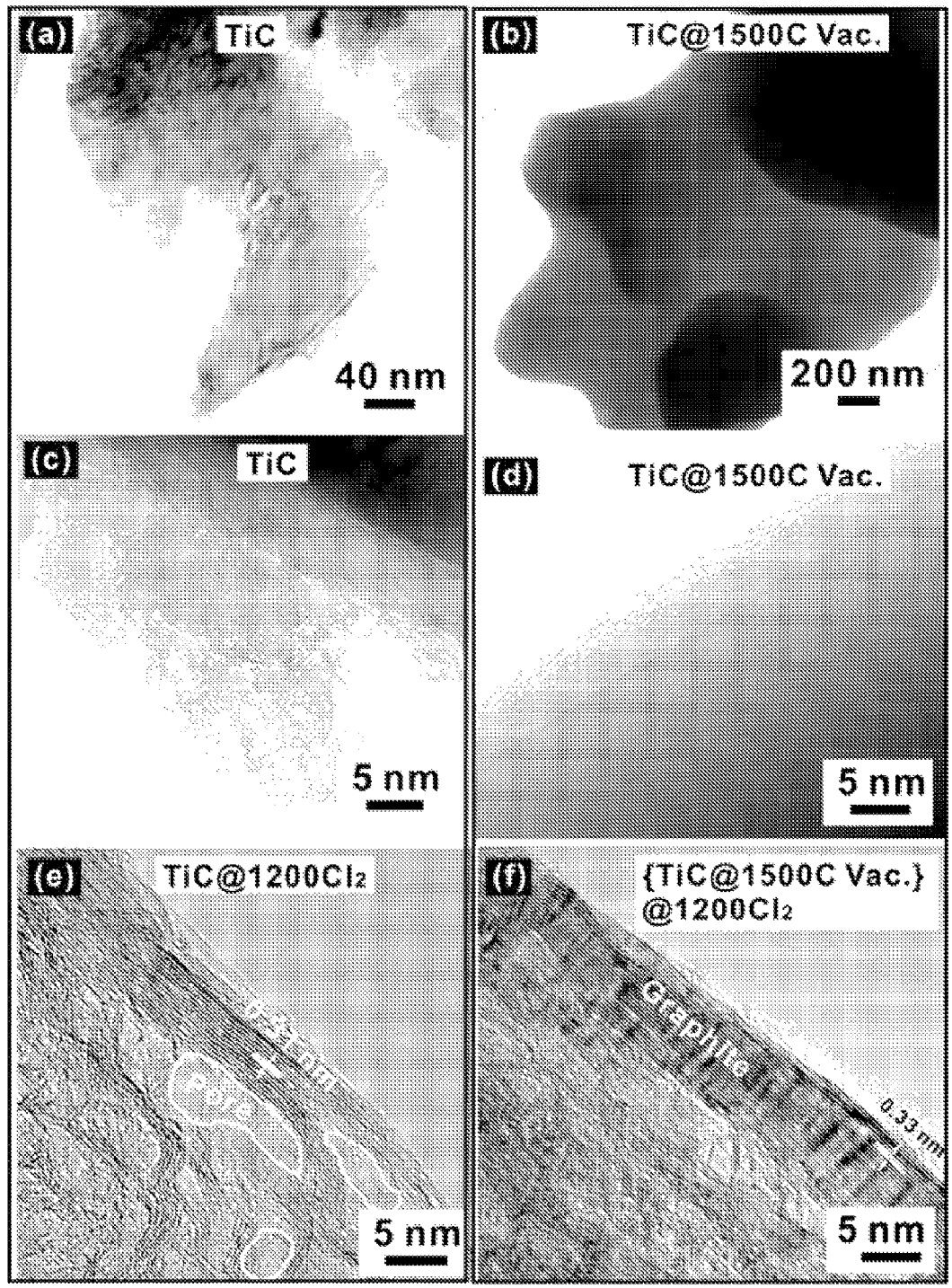
FIGS. 5A and 5C illustrate transmission electron microscope (TEM) images of TiC.
FIGS. 5B and 5D illustrate TEM images of vacuum-treated TiC obtained by thermal treatment at 1500° C. in a vacuum.
FIG. 5E illustrates a TEM image of TiC-CDC obtained by thermochemical reaction with $Cl_2$ gas at 1200° C.
FIG. 5F illustrates a TEM image of vacuum-treated TiC-CDC obtained by thermal treatment at 1500° C. in a vacuum and thermochemical reaction with $Cl_2$ gas at 1200° C.

To compare the structures of Example 1 and Comparative Example 1, the results of XRD measurement are illustrated in FIG. 4.

As illustrated in FIG. 4, the peak of vacuum-treated TiC-CDC of Example 1 was 25.7°, which was shifted leftward compared to 26.3° that is the peak of TiC-CDC of Comparative Example 1. The lattice spacing of vacuum-treated TiC-CDC was larger than that of TiC-CDC.

Test Example 4: TEM Analysis of TiC,
Vacuum-Treated TiC, Vacuum-Treated TiC-CDC,
and TiC-CDC The TEM analytical results of the carbide compound (TiC), vacuum-treated carbide compound (vacuum-treated TiC), vacuum-treated carbide-derived carbon (vacuum-treated TiC-CDC), and carbide-derived carbon (TiC-CDC) are illustrated in FIGS. 5A to 5F.

As illustrated in FIGS. 5A to 5F, when compared with TiC (FIGS. 5A and 5C), vacuum-treated TiC (FIGS. 5B and 5D) had high density due to the agglomeration of the particles into a dense structure. TiC-CDC exhibited a combination structure of an amorphous phase in various locations and graphite fringe therearound, with a porous structure. Vacuum-treated TiC-CDC manifested graphite fringe having a denser structure and thus had a small pore distribution compared to TiC-CDC. Therefore, vacuum-treated TiC-CDC can exhibit high graphite density and a large lattice spacing and thus high ion mobility.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of preparing a carbide-derived carbon, comprising:
   thermally treating a carbide compound in a vacuum, thus obtaining a vacuum-treated carbide compound wherein lattice spacing of the vacuum-treated carbide compound is increased; and
   thermochemically reacting the vacuum-treated carbide compound with a halogen element-containing gas, thus extracting an element other than carbon from the vacuum-treated carbide compound,
   wherein the carbine-derived carbon has an XRD (X-ray diffraction) peak intensity of 6000 to 8000 between 20° and 30°; and;
   wherein thermally treating in a vacuum is performed at 1100~1900° C. for 3~7 hr.

2. The method of claim 1, wherein the carbide compound is a compound of carbon and an element selected from the group consisting of Groups 3, 4, 5, and 6 elements, and combinations thereof.

3. The method of claim 2, wherein the carbide compound is at least one selected from the group consisting of SiC, $B_xC_y$, TiC, $ZrC_x$, $Al_xC_y$, $Ca_xC_y$, $Ti_xTa_yC$, $Mo_xW_yC$, $TiN_xC_y$, $ZrN_xC_y$, $SiC_4$, TiAlC, and $Mo_2C$ (wherein x and y are stoichiometrically determined).

4. The method of claim 3, wherein the carbide compound is TiC.

5. The method of claim 1, wherein the halogen element-containing gas is selected from the group consisting of $Cl_2$, $TiCl_4$, and $F_2$.

6. The method of claim 5, wherein the halogen element-containing gas is $Cl_2$.

7. The method of claim 1, wherein thermochemically reacting is performed at 200~1200° C.

8. The method of claim 7, wherein thermochemically reacting is performed for 3~5 hr.

9. The method of claim 1, further comprising performing annealing with any one gas selected from the group consisting of $H_2$, Ar, $N_2$, and $NH_3$, after thermochemically reacting.

10. The method of claim 9, wherein annealing is performed for 1~3 hr.

* * * * *